United States Patent Office 3,169,492
Patented Feb. 16, 1965

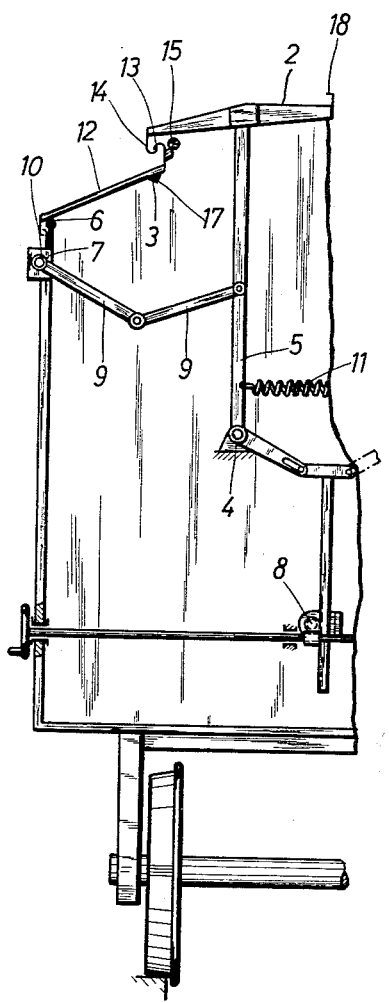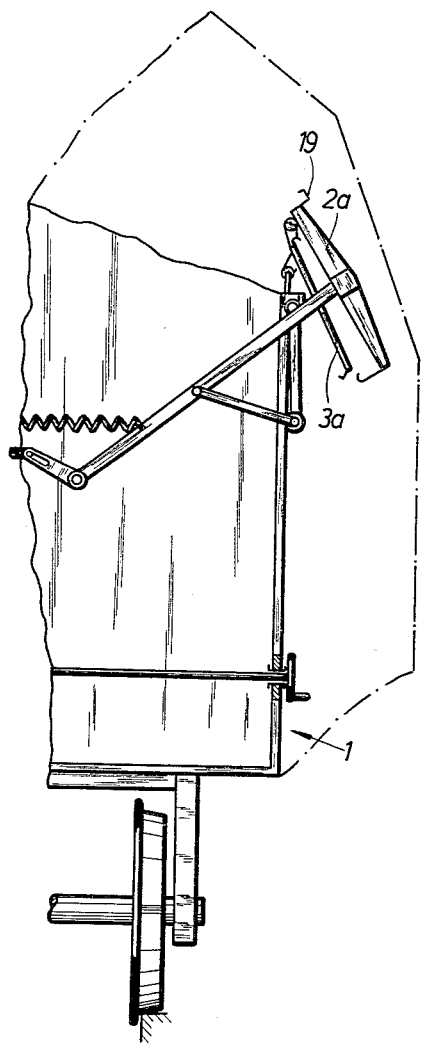

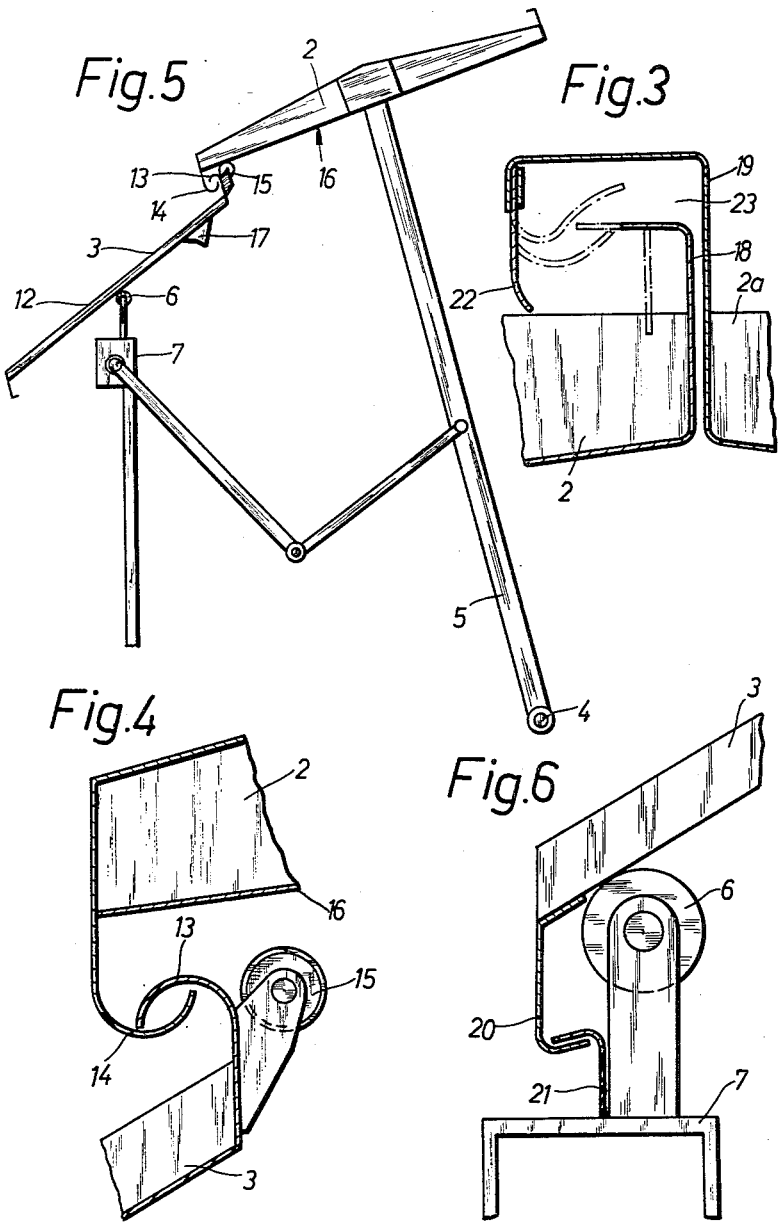

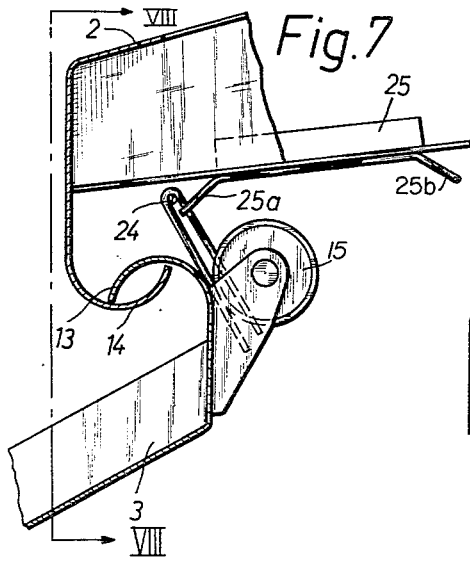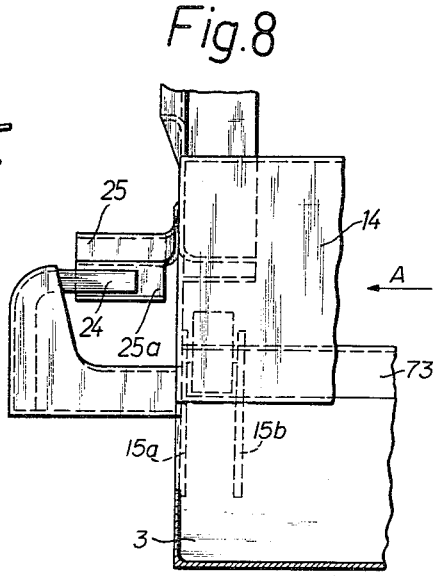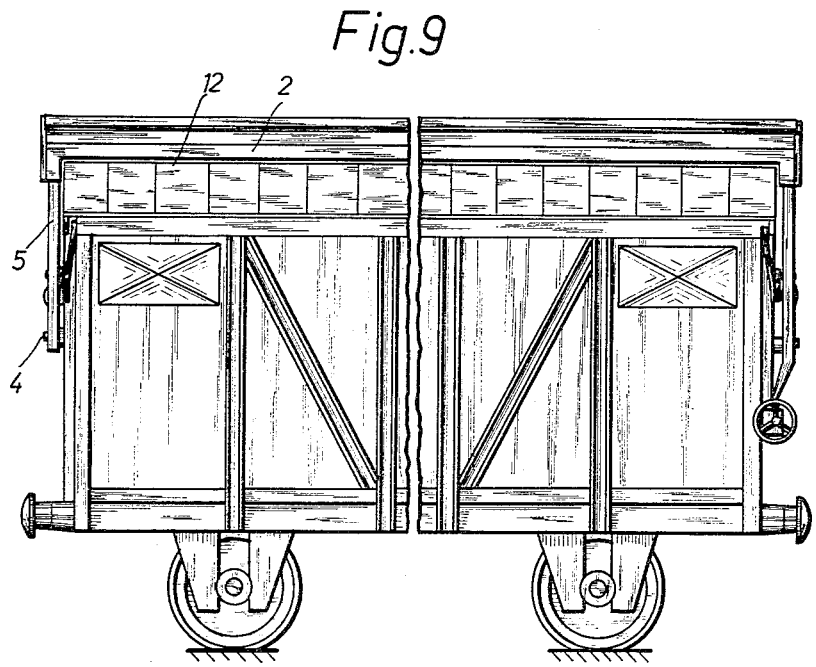

3,169,492
TILTABLE ROOF FOR STREET AND RAIL VEHICLES
Christian J. Stiefel and Wilhelm Blank, Aachen, and Helmut König, Minden, Westphalia, Germany, assignors to Waggonfabrik Talbot, Aachen, Germany
Filed Oct. 1, 1963, Ser. No. 313,025
Claims priority, application Germany, Oct. 5, 1962, W 33,074
6 Claims. (Cl. 105—377)

The present invention relates to a tiltable roof for street and rail vehicles which extends over the entire length of the car box and while resting on supporting columns rotatable about fixed pivots on the end walls of the car, is adapted to be tilted toward the sides of the car by means of a drive arranged at one end of the car.

In order to shorten the loading and unloading time of transport vehicles, continuous efforts have been made to mechanize the loading and unloading operations. As far as open vehicles are concerned, as they are employed for instance for the transport of goods which are not sensitive to inclement weather, no difficulties are encountered when employing hoists, cranes, bucket conveyors and similar conveyors, for speeding up the loading and unloading of the respective goods inasmuch as such machinery can easily get at the goods. However, when the loading and unloading of closed cars is involved, which cars have to be used to protect goods sensitive to the atmosphere and inclement weather, considerable difficulties are encountered in loading and unloading the goods through relatively small door openings which limit the accessibility.

Efforts have therefore been made to make possible the loading and unloading of such cars from the top by employing removable roofs or by employing tiltable lids. However, considerable drawbacks have been encountered with this type of vehicles. In an effort to improve the last mentioned type of construction, so-called lift-slide roofs have been designed which while improving the situation, are still not satisfactory inasmuch as they do not give the mechanized loading and unloading equipment the necessary space because the last mentioned construction still comprises parts which impede a completely free movement of the loading and unloading devices over the car box.

According to other heretofore known designs, cover means are employed which extend from one car end face to the other end face or over a portion of the space therebetween. These cover means are either divided along the longitudinal central portion thereof so as to be able to move to both sides of the vehicle or they form a single structure adapted to be tilted to one or the other side of the vehicle. In connection with this type of design it is known to provide the bottom side of the roof with rollers resting on transverse frame members. Such transverse frame members, however, interrupt the loading opening and are, therefore, disadvantageous especially with regard to the loading of bulky and long pieces.

There are also roof structures for vehicles known which are adapted in a self-supporting manner to cover the entire length of the loading opening without supports extending over the loading opening. Such tiltable roofs rest on the end walls and, more specifically, on supporting columns on said end walls which are turnable about fixed bearings, said supporting columns being operable by means of a drive to tilt the roof.

In spite of the advantages that with the above mentioned designs it is possible to transport goods and materials in a reliable manner and well protected against inclement weather, and in spite of the fact that by the provision of undivided loading openings a more economic employment of mechanized loading and unloading machinery has been made possible, the heretofore known arrangements still have considerable drawbacks. More specifically, the heretofore known designs have certain limitations with regard to the opening width of the loading opening which should be as large as the bottom of the loading surface. With these designs, loading machinery introduced into the car box cannot reach every part of the loading surface. Also the loading capacity is still affected by the heretofore known arrangements. Large loading width requires large lids and naturally large opening strokes of the lids the path of movement of which, however, is limited with railway vehicles by the permissible overall width of railway cars. This resulted in the known constructions according to which the lids have been designed to be tilted vertically by complicated tilting mechanisms between the free space profile determined by the maximum permissible overall width and height of a railway car, and the side walls of the railway car or the roof lids have to be strongly arched as a result of which the upper frame of the side walls has to be located considerably lower so that the free passage or door openings had to be considerably reduced.

It is, therefore, an object of the present invention to provide a universal transport vehicle which will overcome the above mentioned drawbacks.

It is another object of this invention to provide a universal transport vehicle which while having an unobstructed loading opening of substantially the same magnitude as the bottom loading surface of the vehicle will make it possible to provide a tiltable roof which when tilted to free the loading opening will allow to arrange and design the side walls and revolving and sliding doors in the same manner as customary with standard freight cars.

It is also an object of the present invention to provide a universal transport vehicle as set forth above which will meet all transport and loading conditions for normal bulk and pourable goods.

These and other objects and advantages of the invention will appear more clearly from the following specification in connection with the accompanying drawings, in which:

FIG. 1 is a diagrammatic cross section through half of a transport vehicle according to the present invention with the roof sections occupying their closed roof forming position and with a mechanical drive for actuating the roof.

FIG. 2 diagrammatically illustrates a cross section through the other half of a vehicle according to the invention but with the roof sections in opened position.

FIG. 3 diagrammatically illustrates on a considerably larger scale than that of FIGS. 1 and 2 a rain and snow proof roof cap joint in the central longitudinal portion of the roof.

FIG. 4 diagrammatically shows a rain and snow proof releasable suspension of the outer roof cap on the inner cap, the scale of FIG. 4 likewise being considerably increased over that of FIGS. 1 and 2.

FIG. 5 shows the same portion illustrated in FIG. 4 but on a smaller scale and after release of the suspension.

FIG. 6 illustrates the rain and snow proof free support of the outer roof cap with its outer longitudinal edge resting on rollers over the lateral wall of the vehicle.

FIG. 7. show the suspension according to FIG. 4 with automatic guiding of the outer roof cap as seen in the direction of the arrow A of FIG. 8.

FIG. 8 is a side view of FIG. 7.

FIG. 9 is a section taken along the line VIII—VIII of the transport vehicle.

FIG. 9 is a side view of a transport vehicle according to the present invention.

The construction according to the invention is characterized primarily in that the tiltable roof is composed of at least two inner self-supporting roof caps or roof sections and two outer roof caps or roof sections which on one hand are pivotally suspended in a releasable suspension on the inner roof sections and on the other hand are freely supported on rollers over the upper frame on the lateral wall. A tiltable roof of this type can easily be tilted in and out in less than a minute and from an accident proof distance by the operator at the level of the rails or at the level of a loading ramp.

According to a practical embodiment of the present invention, the suspension of the outer roof sections on the inner roof sections during the tilting operation is releasable during the tilting operation by tilting the outer roof sections over the roller support and by sliding the two roof sections one above the other. In opened condition, all parts of the tiltable roof are located within the space confined by the free width of the vehicle and by the prescribed confining profile.

Referring now to the drawings in detail, the vehicle illustrated therein and representing a railroad freight 1 has a four-sectional roof. Two sections of said roof form the inner roof caps or inner roof sections 2 whereas two other roof section form the outer roof caps or roof sections 3. The arrangement is such that one inner and the adjacent one of the outer roof sections are located symmetrically to and tiltable outwardly to the other inner and outer roof sections. In view of the completely identical design, arrangement and function of the two pairs of roof sections on each side of the longitudinal plane of symmetry of the vehicle, only one of the pairs will be described.

The inner roof cap 2 which is designed as self-supporting structure is supported by pivotable supporting columns 5 pivotably journalled in fixed bearings 4 at the end walls of the vehicle only. Roof section 2 extends over the entire length of the loading opening of the vehicle while when the roof is closed, the joint of the two inner roof sections 2, 2a is covered in a rain and snow proof manner as illustrated for instance in FIG. 3. The safe function of the seal might in some instances, especially when long inner roof sections 2 are employed, be affected by an uneven elastic bending of one of the inner roof sections with regard to the other inner roof section so that additional means known per se may have to be provided which hold the two inner roof sections at the same level. The outwardly extending longitudinal edge of roof section 2 is designed in conformity with FIG. 4 in such a way that the folded-over longitudinal sheet metal portion 13 extends into the oppositely folded-over longitudinal sheet metal portion 14. The outer roof section 3 is a very lightly built roof section which when the roof is closed, as mentioned above, has its inner longitudinal edge suspended in the inner roof section 2, whereas its outwardly located longitudinal edge portion is resting in a freely movable manner on rollers 6 as shown in FIG. 6 and represents a rain and snow proof construction. The rollers 6 are arranged on the upper frame 7 on the lateral wall of the vehicle. For additional means to hold the two inner roof sections at the same level, for instance, the rollers are provided (U.S. Patent 3,008,759).

When opening the roof, the supporting column 5 for the inner roof section or roof cap 2 is tilted about its bearing 4 by means of any standard drive 8, for instance a mechanically operable manual drive. If desired, however, also electrical, pneumatic or hydraulic drives may be employed. The column 5 at one end of the vehicle is driven, whereas the column arranged on the other end of the vehicle is rotated by means of a link system 9 and a transmission shaft 10 so that both supporting columns will be rotated over the same angle and a uniform movement of the caps 2 over their entire length will be assured. Energy storing means 11 will equalize the energy consumption varying during the opening and closing operation.

To the extent to which the roof caps 2 are tilted during the opening of the roof, the roof sections 3, which first according to FIG. 4 are pivotally but non-releasably suspended in said roof caps 2, are adapted to roll on rollers 6 toward the side of the vehicle as if they were rolling on an inclined plane. This continues as long as the center of gravity 12 of the roof sections 3 is located within the cross section of the vehicle which with regard to FIG. 1 means to the right of the fixed rollers 6. When the center of gravity passes beyond the roller support, i.e. moves outside the cross section of the vehicle, which with regard to FIG. 1 means toward the left beyond the roller support, a left turning tilting torque will be exerted upon the roof support 3 as a result of which the suspension of roof sections 3 is released. This release is effected in conformity with FIG. 5 by the fact that the roof section is located to the right of roller 6 and is thus lifted out of the grasp of the folded sections 13 and 14. This is the case when the roller 15 arranged on roof section 3 rests against a rolling surface 16 provided on the bottom side of roof section 2. When further tilting both roof sections 2 and 3, the abutment 17 connected to roof section 3 will rest against roller 6 whereby a further tilting out of roof section 3 will be prevented as clearly shown in the FIG. 2. Roof section 2 which alone continues to tilt outwardly has its rolling surface 16 slide over rollers 15 to the final opening position of both roof sections as shown in FIG. 2 in which position the free width of the vehicle is fully available as loading opening.

The closing operation is, of course, effected in the reverse manner. The inner roof section 2 is tilted inwardly while the rolling surface 16 thereof passes over rollers 15, and the roof section 3 aside from a minor pendulum movement, does not carry out an inwardly tilting movement. Only when the folded-over portions 13 and 14 are located above each other for interengagement, is the roof section 3 likewise tilted inwardly. When the center of gravity 12 of said roof section 3 is again located at the right with regard to the supporting rollers 6, the right hand roof section again tilts downwardly so that the suspension 13, 14 becomes effective and both roof sections 2, 3 will together move into closing position.

Unusual weather and climate conditions or also difficult conditions of operation can harmfully affect the suspension of the roof sections during the tilting movements. In such special instances, the tilting movements produced by the displacement of the center of gravity may be controlled by automatic guiding means which will bring about that the outer roof sections 3 will safely engage and disengage the inner roof sections 2. Disturbances of this type may occasionally occur by a too large elastic bending in view of a snow load or ice formation thereon. In order to exclude such disturbances, according to FIGS. 7 and 8 a follower 24 folded in longitudinal direction of the roof is at structurally determined distances connected to the longitudinal fold 13 of the outer roof section 3 or more specifically to bearing support 15a of roller 15 (FIG. 8). When during the opening operation the center of gravity 12 passes outside the roller support 6, and if, as a result thereof, due to a failure of the roof section 3 to tilt, the suspension is not released, roof section 3 will while being held by roof section 2 roll together with the latter outwardly over the roller 6 until the abutment 17 rests against roller 6. In this way roof section 3 remains stuck, whereas roof section 2 tilts further outwardly. In this way the lower horizontal forwardly bent leg 25a of a guiding angle 25 connected to the inner roof section 2 moves below the follower 24 and will, when roof section 2 is further tilted, tilt roof section 3 until roller 15 abuts rolling surface 16. When this happens, automatically parts 13 and 14 disengage each other as is necessary in order to be able further to open the roof section in conformity with the described operation. During the closing operation, the automatic tilting is effected correspondingly by the leg 25b pertaining to the guiding angle 25 and bent downwardly at the rear end. However, also other known automatic guiding arrangements may be used, as for instance guiding loops arranged on the end walls of the vehicle.

The drawings merely illustrate by way of example how the longitudinal edges of the roof sections may be designed. Of course, also other designs are possible which will assure a weather-proof cover adapted to be released in conformity with FIG. 4.

When the roof occupies its closing position, the longitudinal edge portions 18 and 19 of the roof sections 2, 2a do not firmly engage each other but shortly prior to the closing position according to FIG. 6 the edge portion 20 of roof section 3 and the sheet metal portion 21 arranged on the upper frame 7 of the side wall will firmly engage each other, while roof section 2 is still being moved. In this way, the roof sections brace each other so that differences in construction and play will be eliminated which otherwise might cause a lack of seal and a rattling during the movement of the vehicle.

As will be evident from FIG. 3, for purposes of obtaining a completely safe seal of the joint between roof sections 2, 2a which joints are located along the central longitudinal plane when the roof is closed, at the folded longitudinal sheet metal portion 19 there is provided a longitudinally extending sealing strip 22 of rubber or the like which closes a labyrinth chamber 23 and during the opening and closing of the roof permits the opposite movements of the folded-over edges 18 and 19 of the roof sections 2 by elastically moving toward the side. The sealing effect will be the following one. When the roof is closed, the sealing strip slightly elastically bent, rests on the roof skin of the roof section 2. During strong lateral rain, the end of the sealing strip might under certain circumstances be lifted off from the roof skin even to such an extent that, while sealing the labyrinth chamber, it will rest against the bottom edge of the folded-over longitudinal sheet metal part 18. If after completion of the closing operation, the end of the sealing strip should for some reason, for instance if due to outer influences the air gap between parts 18 and 19 has been increased, remain suspended or stuck on the folded-over longitudinal part 18, it will still safely seal the labyrinth chamber 23. The individual possibilities are indicated in FIG. 3 by dot-dash lines.

The roof sections may be made of heavy or light metal or of synthetic materials. In particular, the outer roof sections 3, 3a which are required merely for covering but not for supporting a load, may be made of light frame material with intermediate struts, the fields of which are filled in with smooth or corrugated or transparent synthetic materials. It is also possible to cover the frame merely with a water proof textile material.

It is, of course, to be understood that the present invention is, by no means, limited to the particular constructions shown in the drawings but also comprises any modifications within the scope of the appended claims.

What we claim is:

1. In combination with a vehicle having a box-shaped car body open at the top and provided with a bottom and two end walls, a multi-sectional roof structure, which comprises: two inner roof sections movable in opposite direction to each other into a closing position in which they extend side by side in a self-supporting manner from one end wall to the other end wall of said car body so as to cover the central open top portion of said car body, tiltable supporting members respectively pivotally connected to said end walls and supporting said inner roof sections for selectively tilting said inner roof sections from an open position to a closing position and from said closing position to said open position in which latter position said inner roof sections are located outside the vertical upward projection of said car bottom and at opposite sides thereof, two outer roof sections movable in opposite direction to each other from an open position to a closing position and vice versa and in said last mentioned closing position respectively extending adjacent to and along the respective adjacent inner roof sections from one end wall to the other end wall of said car body so as to cover open top portions of said car body other than those covered by said inner roof sections, said outer roof sections when occupying their closing position being detachably suspended in the respective adjacent inner roof sections, and roller means carried by said end walls and supporting said outer roof sections for movement thereon.

2. An arrangement according to claim 1, in which said outer roof sections are tiltable about said roller means during the tilting of said supporting members for disengaging said outer roof sections from said inner roof sections and moving the inner roof sections over said outer roof sections.

3. In combination with a vehicle having a box-shaped car body open at the top and provided with a bottom and two end walls, a multi-sectional roof structure, which comprises: two inner roof sections movable in opposite directions to each other into a closing position in which they extend side by side in a self-supporting manner from one end wall to the other end wall of said car body so as to cover the central open top portion of said car body, tiltable supporting members respectively pivotally connected to said end walls and supporting said inner roof sections for selectively tilting said inner roof sections from an open position to a closing position and from said closing position to said open position in which latter position said inner roof sections are located outside the vertical upward projection of said car bottom and at opposite sides thereof, two outer roof sections movable in opposite direction to each other from an open position to a closing position and vice versa and in said last mentioned closing position respectively extending adjacent to and along the respective adjacent inner roof sections from one end wall to the other end wall of said car body so as to cover open top portions of said car body other than those covered by said inner roof sections, said outer roof sections when occupying their closing position being detachably suspended in the respective adjacent inner roof sections, roller means carried by end walls and supporting said outer roof sections for movement thereon, and means for positively guiding said outer roof sections.

4. In combination with a vehicle having a box-shaped car body open at the top and provided with a bottom and two end walls, a multi-sectional roof structure, which comprises: two inner roof sections movable in opposite direction to each other into a closing position in which they extend side by side in a self-supporting manner from one end wall to the other end wall of said car body so as to cover the central open top portion of said car body, tiltable supporting members respectively pivotally connected to said end walls and supporting said inner roof sections for selectively tilting said inner roof sections from an open position to a closing position and from said closing position to said open position in which latter position said inner roof sections are located outside the vertical upward projection of said car bottom and at opposite sides thereof, two outer roof sections movable in opposite direction to each other from an open position to a closing position and vice versa and in said last mentioned closing position respectively extending adjacent to and along the respective adjacent inner roof sections from one end wall to the other end wall of said car body so as to cover open top portions of said car body other than those covered by said inner roof sections, said outer roof sections when occupying their closing position being detachably suspended in the respective adjacent inner roof sections, means connected to said inner roof sections for guiding said outer roof sections, and roller means carried by said end walls and supporting said outer roof sections for movement thereon.

5. An arrangement according to claim 1, in which said inner and outer roof sections when occupying their open position are located within the space defined by the free width of the vehicle and the maximum permissible width of railway vehicles.

6. In combination with a vehicle having a box-shaped car body open at the top and provided with a bottom and two end walls, a multi-sectional roof structure, which comprises: two inner roof sections movable in opposite direction to each other into a closing position in which they extend side by side in a self-supporting manner from one end wall to the other end wall of said car body so as to cover the central open top portion of said car body, tiltable supporting members respectively pivotally connected to said end walls and supporting said inner roof sections for selectively tilting said inner roof sections from an open position to a closing position and from said closing position to said open position in which latter position said inner roof sections are located outside the vertical upward projection of said car bottom and at opposite sides thereof, sealing strip means carried by one of said inner roof sections and extending over the entire length thereof and adapted in cooperation with the other inner roof section to seal any gap therebetween in closing position of said inner roof sections, two outer roof sections movable in opposite direction to each other from an open position to a closing position and vice versa and in said last mentioned closing position respectively extending adjacent to and along the respective adjacent inner roof sections from one end wall to the other end wall of said car body so as to cover open top portions of said car body other than those covered by said inner roof sections, said outer roof sections when occupying their closing position being detachably suspended in the respective adjacent inner roof sections, and roller means carried by said end walls and supporting said outer roof sections for movement thereon.

No references cited.